_United States Patent Office_

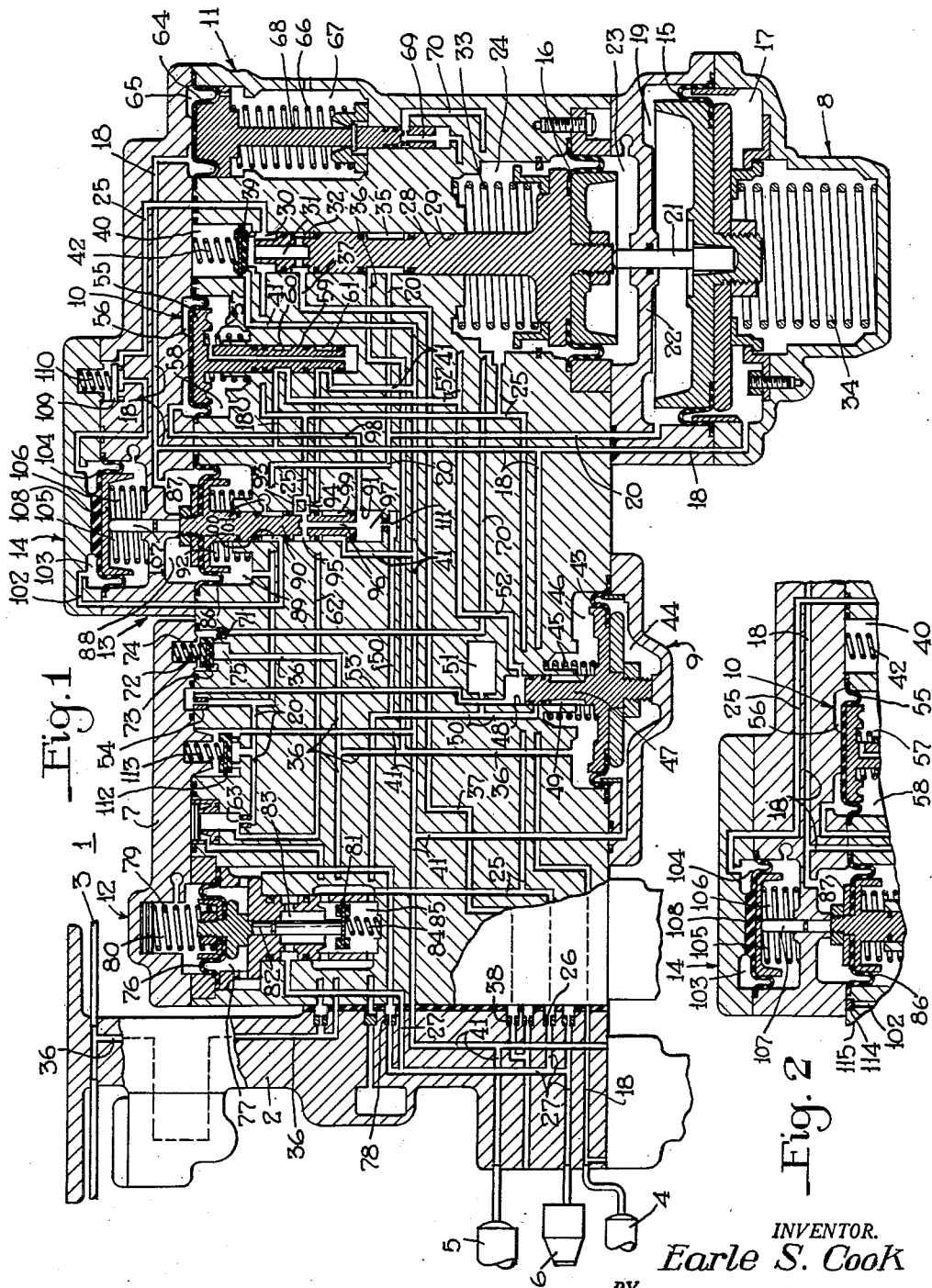

2,836,466
Patented May 27, 1958

2,836,466

GRADUATED RELEASE TYPE BRAKE CONTROLLING VALVE WITH IMPROVED CONTROL RESERVOIR CHARGING CONTROL

Earle S. Cook, Pittsburgh, Pa., assignor to Westinghouse Air Brake Company, Wilmerding, Pa., a corporation of Pennsylvania Application August 15, 1955, Serial No. 528,471

6 Claims. (Cl. 303—35)

This invention relates to fluid pressure brake apparatus of the graduated release type within the degree of application and release of brakes on a railway car or the like is controlled according to the degree of reduction and restoration, respectively, of pressure of fluid in a brake pipe relative to a datum pressure in a control reservoir; this invention relating more particularly to an apparatus of the above type embodying an improved arrangement for controlling, during an application of brakes, the closure of a charging communication via which the control reservoir is charged from the brake pipe and for also controlling reestablishment of this communication during a release of brakes.

The copending application of Thomas F. Hursen, U. S. Serial No. 527,342, filed August 9, 1955, and assigned to the assignee of the present application, discloses a quick service valve and a charging valve which cooperate to serially control, and normally permit, flow through a charging communication connecting the control reservoir and brake pipe. The quick service valve responds to a slight reduction in brake pipe pressure below its normal full charge value after initiation of a brake application to initially close the charging communication and then effect the usual quick service reduction in brake pipe pressure; whereas the charging valve thereafter responds to brake cylinder pressure in excess of a small value to additionally close the charging communication and maintain the latter closed until, during a release of brakes, brake cylinder pressure is reduced to below said small value, despite earlier operation of the quick service valve to a position in which it would permit the flow through the charging communication.

With the arrangement just described, brake pipe pressure will be about 3 p. s. i. below its normal full charge value, and hence below control reservoir pressure, at the time the charging valve operates to reopen the charging communication; and although depletion of control reservoir pressure into the brake pipe by backflow through the charging communication is minimized by virtue of the restricted flow capacity of the choke in said communication and the relatively small pressure differential across this choke, it is nevertheless desirable that reopening of the charging communication be deferred until brake pipe pressure has attained a value even closer to its normal full charge value, so as to further minimize the possibility of such depletion in control reservoir pressure. This is important because the triple or service valve operates to control brakes according to the extent brake pipe pressure is reduced below control reservoir pressure; and hence if brakes are successively reapplied, such as while descending a long grade, and control reservoir pressure is successively depleted by such backflow into the brake pipe and not restored between such successive brake applications, then for each one p. s. i. control reservoir pressure has been thus reduced below its normal datum value, a corresponding loss of 2.9 p. s. i. of brake cylinder pressure will be experienced for any given degree of reduction in brake pipe pressure below its normal full charge value, because the service valve is of the differential relay controlled type wherein brake cylinder pressure acts on a diaphragm of much smaller area than the diaphragm on which control reservoir pressure and brake pipe pressure opposingly act.

It is therefore one object of this invention to provide an improved brake apparatus of the above general type embodying a novel arrangement wherein the charging valve is operated by brake cylinder pressure to a position for closing a charging communication between the control reservoir and brake pipe and is maintained in said position, until after the brake cylinder is completely vented, by fluid under pressure supplied from another source.

Another object is to provide an improved brake apparatus of the above type embodying a novel arrangement wherein the quick service valve initially closes a restricted charging communication between the control reservoir and brake pipe and the charging valve thereafter responds to brake cylinder pressure in excess of a small value to move to a cut-off position for additionally closing said charging communication, and wherein a quick service reduction insuring valve thereafter responds to a chosen degree of quick service reduction in brake pipe pressure to move from a normal position to a quick service cut-off position, in which it supplies fluid under pressure from an auxiliary reservoir to said charging valve for maintaining the latter in its said cut-off position.

Another object is to provide a brake apparatus of the type described in the preceding object, characterized by the provision of a novel arrangement for insuring stoppage of the reduction insuring valve in an intermediate position in its traverse from quick service cut-off position back toward its normal position incident to a release of brakes; and in which intermediate position the usual quick service volume is vented and supply of auxiliary reservoir pressure to the charging valve is maintained.

Other objects and advantages will become apparent from the following more detailed description of the invention and from the accompanying drawing, wherein Fig. 1 is a diagrammatic view of a brake apparatus embodying the invention, and Fig. 2 is a fragmentary diagrammatic view showing a modification of the embodiment of Fig. 1.

_Description_

Since many of the components of the brake apparatus embodying the invention may, for sake of illustration, be generally similar in structure and in operation with the respective types shown and described in the aforementioned copending application, the following description has been abbreviated insofar as is consistent with the clear understanding of the present invention; and only such structure as relates to the novel features of the present invention will hereinafter be described in detail.

_Fig. 1_

As shown in Fig. 1 of the drawing, the improved brake apparatus comprises a brake controlling valve device 1 which is provided on each brake-equipped car of the train. This valve device 1 comprises a pipe bracket 2, to which are connected the usual brake pipe 3, a control reservoir 4, an auxiliary reservoir 5, and a brake cylinder device 6. On one face of the pipe bracket 2 is mounted a sectionalized casing 7, within which are contained a service valve device 8, a quick service valve device 9, a charging valve device 10, a charging cut-off valve device 11, and a brake cylinder inshot valve device 12, all of which may be substantially identical in structure and in operation with the corresponding valve devices disclosed in the aforementioned copending application. Also contained within the casing 7 is a quick service reduction insuring valve device 13, which differs from the corresponding valve devices heretofore proposed according to features of the invention hereinafter to be described; and associated with said valve device 13 is a loading device 14 that may be identical with that disclosed in the aforementioned copending application.

The service valve device 8 may comprise two coaxially arranged, spaced apart movable abutments, designated generally by the reference numerals 15, 16 and cooperably, though not positively, connected to each other so as to form a stack, as will be understood from subsequent description. The movable abutment 15 is subject at its under side, as viewed in the drawing, to pressure of fluid in a chamber 17, which is constantly open to the control reservoir 4 via a passage 18; and said movable abutment is subject at the opposite side to pressure of fluid in a chamber 19 constantly open to a passage 20 that is normally open to the brake pipe 3 via communication hereinafter to be described.

The movable abutment 15 is cooperably connected to the movable abutment 16 through the medium of a coaxially arranged, cylindrical pusher stem 21 that has sealing, slidably guided engagement with the wall of an aligned bore in a casing partition 22 separating chamber 19 from an atmosphere chamber 23. At the side of the movable abutment 16 opposite the chamber 23 is a chamber 24 that is constantly open to the brake cylinder device 6 via a passage 25, a brake cylinder application choke 26, and a brake cylinder passage 27.

The movable abutment 16 is connected to a coaxially arranged, cylindrical service valve 28 that projects through the chamber 24 and adjacent its projecting end has sealing, slidably guided engagement with the wall of an aligned bore 29 formed in the casing and open to said chamber. Adjacent its projecting end, valve 28 is of reduced diameter so as to define, in cooperation with the surrounding bore 29, an annular chamber 30; and extending inwardly from said projecting end is an axially arranged, bore-like opening 31 that is constantly open via a radial aperture to an elongated annular cavity 32 formed in said valve intermediate its ends.

A helical spring 33 in chamber 24 acts on the movable abutment 16 and, through the medium of the stem 21, on the movable abutment 15 for urging the stack to the position in which it is shown in the drawing, and in which position the movable abutment 15 operatively engages, but does not compress, the usual caged helical spring 34 in the chamber 17, for thereby defining a brake release position of the service valve 28. In this position, an elongated annular cavity 35 in the valve 28 connects a branch of the passage 20 to a brake pipe passage 36 leading to the brake pipe 3. And also with valve 28 in this position, the cavity 32 is in registry with a brake cylinder release passage 37 constantly open to atmosphere via a release choke 38, such that the brake cylinder device 6 is then open to atmosphere via a brake cylinder release communication comprising a branch of the passage 25, the chamber 30, opening 31, cavity 32, and said release passage 37. Also, with the valve 28 in its brake release position, the projecting end of said valve is out of engagement with a check valve 39 that controls fluid pressure communication between the chamber 30 and a chamber 40 that is constantly open to the auxiliary reservoir 5 via a passage 41; said check valve 39 being biased to a seated position by pressure of a helical bias spring 42 in said chamber 40 for normally preventing such communication.

The quick service valve 9 may comprise a movable abutment, designated generally by the reference numeral 43 and subject at one side to auxiliary reservoir pressure in a chamber 44 constantly open to a branch of auxiliary reservoir passage 41, and subject at the opposite side to pressure of a helical spring 45 and brake pipe pressure in a chamber 46 constantly open to a branch of brake pipe passage 36. The movable abutment 43 is operatively connected to a coaxially arranged, cylindrical quick service valve 47 that projects through the chamber 46 and adjacent its projecting end has sealing, slidably guided engagement with the wall of an aligned bore 48 in the casing.

When brake pipe pressure in chamber 46 is substantially equal to auxiliary reservoir pressure in chamber 44, the spring 45 is effective to bias the quick service valve 47 to a normal position, in which it is shown in the drawing. With the valve 47 in this position, an elongated annular cavity 49 formed therein and constantly open to the chamber 46 is out of registry with a passage 50 leading to the usual quick service volume 51; and the projecting end of said valve is so disposed as to uncover a passage 52 to a passage 53, for permitting flow of fluid from the brake pipe to the control reservoir 4 via a branch of passage 20, a control reservoir combined slow charge and overcharge dissipation control choke 54, passages 53, 52 and communication presently to be described.

The charging valve device 10 may comprise a movable abutment, designated generally by the reference numeral 55, subject at one side to pressure of fluid in a chamber 56 and at the opposite side to pressure of a helical bias spring 57 in an atmospheric chamber 58. The movable abutment 55 is operatively connected to a coaxially arranged, cylindrical charging valve 59 that projects through the chamber 58 and adjacent its projecting end has sealing, slidably guided engagement with the wall of an aligned bore in the casing.

When pressure of fluid in the chamber 56 is below a preselected value, such as about 1 p. s. i., the spring 57 is effective to bias the valve 59 to a charging position in which it is shown in the drawing. With the valve 59 in this position, an elongated annular cavity 60 therein connects a branch of passage 52 with a branch of control reservoir passage 18; and an elongated annular cavity 61 in said valve connects a branch of passage 41 with a passage 62 that is constantly open to a branch of passage 20 via an auxiliary reservoir slow charge control choke 63.

The charging cut-off valve device 11 may comprise a movable abutment, designated generally by the reference numeral 64, subject at one side to pressure of fluid in a chamber 65 constantly open to a branch of control reservoir passage 18, and subject at the opposite side to pressure of a helical regulating spring 66 in an atmospheric chamber 67.

When control reservoir pressure in chamber 65 is below a preselected value, such as 65 p. s. i., the spring 66 will urge the movable abutment 64 and a coaxially connected, cylindrical charging cut-off valve 68 to a cut-in position, in which they are shown in the drawing, and in which a branch of the passage 52 is connected via a suitable opening 69 in said valve to a passage 70 that is open via a control reservoir fast charge control choke 71 to a chamber 72 at one side of a control reservoir charging check valve 73. This check valve is biased to a seated position by a helical bias spring 74 for preventing flow from chamber 72 to a chamber 75 constantly open to a branch of brake pipe passage 36; said check valve permits flow, however, from chamber 75 to the chamber 72.

The brake cylinder inshot valve device 12 may comprise a movable abutment 76 subject at one side to brake cylinder pressure as noted in a chamber 77 via the usual baffle choke 78 and a branch of brake cylinder passage 27, and subject at the opposite side to pressure of a helical regulating spring 79 in an atmospheric chamber 80. The movable abutment 76 controls operation of a coaxially arranged, preferably disc-shaped inshot valve 81 through the medium of an aligned cylindrical pusher stem 82 having sealing, slidably guided engagement with the wall of an aligned bore through a casing partition separating the chamber 77 from a chamber 83 directly open to brake cylinder passage 27.

When brake cylinder pressure in chamber 77 is below a chosen value, such as about 9 p. s. i., the spring 79 will urge the movable abutment 76 and pusher stem 82 to the positions in which they are shown in the drawing for operatively unseating the inshot valve 81 against resistance of a helical bias spring 84 in a chamber 85 open to a branch of passage 25 for permitting flow of fluid under pressure to the brake cylinder device 6 past the unseated inshot valve to the passage 27 in by-pass of the brake cylinder application choke 26.

The reduction insuring valve device 13 may comprise an annular flexible diaphragm 86 suitably clamped about its outer edge between sections of the casing and about its inner edge between parts of a diaphragm follower assemblage 87. The diaphragm 86 is subject at one side to control reservoir pressure in a chamber 88 as noted via a branch of control reservoir passage 18, and is subject at the opposite side to pressure of fluid in a chamber 89 open to a branch of passage 20, which latter passage is open to the brake pipe passage 36 by way of the service valve cavity 35 except under a condition not pertinent to the present invention. Coaxially connected to the assemblage 87 is a cylindrical reduction insuring valve 90 that projects through the chamber 89 and has sealing, slidably guided engagement with the wall of an aligned bore 91 in the casing.

A helical regulating spring 92 in chamber 89 acts on the follower assemblage 87 for urging the reduction insuring valve 90 to a normal position, in which it is shown in the drawing. According to the invention, with the reduction insuring valve 90 in normal position, two axially spaced ports 93, 94 opening through the wall of bore 91 and constantly open to a branch of passage 25 are connected via an elongated annular cavity 95 in said valve and a generally axial opening 96 therein to a chamber 97 that is defined between the projecting end of said valve and the base of bore 91 and is then uncovered by the projecting end of said valve to a passage 98 leading to the chamber 56 of charging valve device 10, for reasons hereinafter to be explained. And also with valve 90 in this position, an elongated annular cavity formed therein is exposed solely to a branch of passage 41; and an elongated annular cavity 100 also formed therein connects to an atmospheric vent port 101, a passage 102 leading to a chamber 103 of the loading device 14.

The loading device 14 may comprise a flexible diaphragm 104 arranged coaxially with the diaphragm 86 and suitably clamped about its outer edge between sections of the casing. The diaphragm 104 is subject at one side to pressure of fluid in the chamber 103 and at the opposite side to pressure of a helical spring 105 in an atmospheric chamber 106. A cylindrical pusher stem 107, arranged coaxially with the diaphragms 104, 86, has sealing, slidably guided engagement with the wall of an aligned bore in a casing partition separating the chamber 106 from the chamber 88.

When pressure in chamber 103 is below a predetermined very slight value, the spring 105, acting through the medium of a diaphragm follower 108, urges the diaphragm 104 to a normal position in which it is shown, and in which position no force is exerted through the medium of said assemblage and stem on the reduction insuring valve 90 so that the latter may move to its previously defined normal position.

A preferably disc-shaped check valve 109 is interposed between a branch of passage 25 and the chamber 103 of loading device 14 for preventing flow of fluid from the brake cylinder device 6 via passage 25 to said chamber, while permitting flow in the reverse direction when pressure in chamber 103 exceeds brake cylinder pressure by a slight degree as determined by the bias exerted by a helical bias spring 110 acting on said check valve against opposition of pressure in said chamber.

According to a feature of the invention, the usual continued quick service reduction choke 111 is interposed in the casing between a branch of the quick service passage 50 and the chamber 97, instead of between this chamber and the brake cylinder device as heretofore proposed, for reasons to be explained subsequently.

*Operation—Fig. 1*

With the brake apparatus devoid of fluid under pressure, all parts heretofore described will be in the positions in which they are shown in the drawing, due to the bias effects of their respective springs, as will be understood from previous description.

*Initial charging of the brake apparatus*

To initially charge the brake apparatus on a train, as well as to recharge the apparatus for effecting a release of brakes after a brake application, fluid under pressure is supplied to the brake pipe 3 at the locomotive in the well-known manner.

On a particular car, some of this fluid under pressure will flow via brake pipe passage 36 to chamber 75 and unseat the control reservoir charging check valve 73 against resistance of spring 74, and then flow past said check valve and at the rate controlled by the control reservoir fast charging control choke 71 through passage 70 and opening 69 in the charging cut-off valve 68 in cut-in position, to passage 52, whence it will flow via cavity 60 in the charging valve 59 in charging position to the control reservoir passage 18 for charging the control reservoir 4 and the chamber 17 of service valve device 8 at a relatively rapid rate. When control reservoir pressure in chamber 65 of charging cut-off valve device 11 exceeds the aforementioned preselected value, illustratively assumed as 65 p. s. i., the charging cut-off valve 68 will be shifted to a cut-off position, in which opening 69 is disconnected from passage 70, for thereby closing the control reservoir fast charging communication just described.

Thereafter, fluid under pressure will be supplied from the brake pipe passage 36 to the control reservoir solely via the cavity 35 of the service valve 28 in brake release position, passage 20, control reservoir combined slow charge and overcharge dissipation control choke 54, passage 53, and past the projecting end of the quick service valve 47 in normal position, to the passage 52, and thence through charging valve cavity 60 to the control reservoir passage 18 at the relatively slow rate controlled by said choke; the flow path just described defining a control reservoir slow charge communication.

Meanwhile, fluid under pressure will flow from brake pipe passage 36 and through cavity 35 in service valve 28 to passage 20 and unseat an auxiliary reservoir charging check valve 112 against resistance of helical bias spring 113, and then flow past said valve to a branch of auxiliary reservoir passage 41 for charging the auxiliary reservoir 5 at substantially the same rate as the brake pipe on said car but to an extent about 1.7 p. s. i. less than brake pipe pressure, due to the bias effect of said spring. Hence, when the auxiliary reservoir 5 has been charged to within 1.7 p. s. i. of the normal full charge value of brake pipe pressure, the check valve 112 will be seated by pressure of spring 113 for closing the auxiliary reservoir fast charge communication just described. Thereafter, fluid under pressure will be supplied from the brake pipe to the auxiliary reservoir 5 solely via a branch of passage 20, the auxiliary reservoir slow charge control choke 63, passage 62, cavity 61 in the charging valve 59 in charging position, and the passage 41 at the relatively slow rate controlled by said choke; the flow path just described defining an auxiliary reservoir slow charge communication.

Throughout initial charging the quick service valve 47 will remain in its normal position because brake pipe pressure supplied to chamber 46 will increase at a more rapid rate than auxiliary reservoir pressure supplied to chamber 44. And also, throughout initial charging, the brake cylinder device 6 will be maintained vented to atmosphere via passage 25, chamber 30 of the service valve device 8, opening 31 and cavity 32 in the service valve 28, and brake cylinder release passage 37 because control reservoir pressure in chamber 17 of said service valve device will increase at substantially the same rate as brake pipe pressure noted in chamber 19 via a branch of passage 20; and hence the inshot valve 81 of inshot valve device 12 will be maintained unseated by pressure of spring 79 on movable abutment 76, because chamber 77 is open to the vented brake cylinder device. Also, the reduction insuring valve 90 will remain in its normal position throughout initial charging because brake pipe pressure supplied to chamber 89 will increase at a more rapid rate than control reservoir supplied to chamber 88; and hence the quick service volume 51 will be maintained open to the vented brake cylinder device 6 via passage 50, choke 111, chamber 97, opening 96 and cavity 95 in said reduction insuring valve, ports 93, 94, and passage 25, and also the chamber 103 of the loading device 14 will be maintained vented to atmosphere via cavity 100 in the reduction insuring valve and the vent port 101.

Hence, at the completion of initial charging, all of the parts of the brake apparatus will be in the respective positions in which they are shown in the drawing, with the exception of the charging cut-off valve 68, which will be in its cut-off position; it being noted that the previously defined control reservoir slow charge communication and auxiliary reservoir slow charge communication will be open throughout initial charging and after completion of initial charging.

Effecting an application of brakes

To initiate an application of brakes, brake pipe pressure is reduced in the brake pipe 3 at the locomotive below its normal full charge value to a chosen degree corresponding substantially to the degree of brake application desired, and is then bottled up in the brake pipe at the desired reduced pressure, in the well-known manner.

When brake pipe pressure in passage 36, and hence in chamber 46 of the quick service valve device 9, on a particular brake-equipped car is reduced a chosen degree, such as .7 p. s. i., below its normal full charge value and hence below then existing auxiliary reservoir pressure in chamber 44, the movable abutment 43 will be shifted against resistance of spring 45 for carrying the quick service valve 47 to a quick service position. During its movement to this position, the quick service valve 47 will successively lap off the passage 52 for closing the previously defined control reservoir slow charge communication and then carry cavity 49 into registry with passage 50 for releasing fluid under pressure from the brake pipe via chamber 46 and said cavity to the previously vented quick service volume 51 for effecting an initial local quick service reduction in brake pipe pressure.

When brake pipe pressure as noted in chamber 19 of service valve device 8 is reduced a preselected degree, such as about 3 p. s. i., (as determined by the bias of about 2 p. s. i. exerted by spring 33 and of about 1 p. s. i. exerted by spring 42 and auxiliary reservoir pressure in chamber 40 acting on check valve 39) the movable abutment stack will be shifted upwardly by control reservoir pressure in chamber 17 against resistance of brake pipe pressure in chamber 19, pressures of springs 33, 42 and auxiliary reservoir pressure in chamber 40 for thereby carrying the service valve 28 to a brake application position, in which the projecting end of said service valve sealingly engages the check valve 39 and holds the latter unseated against resistance of spring 42 for permitting fluid under pressure to flow from the auxiliary reservoir 5 via passage 41 to chamber 30 and thence via passage 25 and past the unseated inshot valve 81 to passage 27 and brake cylinder device 6 in bypass of the brake cylinder application choke 26 for rapidly taking up slack in the brake rigging and if preferred (as in some European countries) rapidly applying brakes to a desired minimum degree, as determined by the value of spring 79. If, as is preferable, the effective area of movable abutment 15 is about three times that of movable abutment 16, the service valve device 8 will respond to a 6 p. s. i. reduction in brake pipe pressure (due to the aforementioned 3 p. s. i. bias on the stack) to provide a brake cylinder pressure of about 9 p. s. i. When brake cylinder pressure in chamber 77 exceeds the illustrative 9 p. s. i., the movable abutment 76 will be shifted upwardly against resistance of spring 79 and retract the pusher stem 82 for permitting spring 84 to seat the inshot valve 81; whereupon fluid thereafter supplied to the brake cylinder device will be via passage 25 and choke 26 at the rate controlled by said choke.

Meanwhile, according to a feature of the invention, fluid under pressure thus supplied to the brake cylinder device 6 will be supplied via passage 25, ports 93, 94, and cavity 95 and opening 96 in the reduction insuring valve 90 in normal position, to chamber 97 and thence past the projecting end of said valve to the passage 98 and chamber 56 of the charging valve device 10. When fluid pressure in chamber 56 exceeds the aforementioned preselected value, illustratively assumed as 1 p. s. i., the movable abutment 55 will be shifted against resistance of spring 57 for carrying the charging valve 59 to a cut-off position, in which the valve cavities 60, 61 are out of registry with the passages 18, 62, respectively, for thereby additionally closing the previously defined and already closed control reservoir slow charge communication and also closing the previously defined auxiliary reservoir slow charge communication so as to prevent depletion of control reservoir pressure and auxiliary reservoir pressure by backflow into the brake pipe.

Meanwhile, after equalization of brake pipe pressure into the quick service volume 51, fluid under pressure will continue to be released from the brake pipe to the brake cylinder device 6 by flow via passage 50, the continued quick service reduction choke 111, chamber 97, opening 96 and port 95 in the reduction insuring valve 90 in normal position, ports 93, 94, and passage 25, for assuring that in the event of a very slight reduction in brake pipe pressure at the locomotive, brake pipe pressure will nevertheless be reduced a preselected degree, such as 6 p. s. i. (as determined by the value of spring 92), for thereby effecting a brake application of a desired preselected minimum degree, irrespective of the "dead" brake pipe volume on any adjacent non-brake-equipped cars.

When brake pipe pressure as noted in chamber 89 of the reduction insuring valve device 13 has reduced the illustrative 6 p. s. i. below its normal full charge value and hence below control reservoir pressure, the diaphragm 86 will be deflected downwardly by control reservoir pressure in chamber 88 against the combined opposition of brake pipe pressure in said chamber 89, pressure of spring 92, and brake cylinder pressure in chamber 97, for thereby carrying the reduction insuring valve 90 to a cut-off position. According to a feature of the invention, with the valve 90 in cut-off position, the valve cavity 99 connects auxiliary reservoir passage 41 with passage 98 so that fluid under pressure will be supplied from the auxiliary reservoir 5 to the chamber 56 of the charging valve device 10 for maintaining the charging valve 59 in its cut-off position. And also the valve cavity 95 is out of registry with the ports 93, 94 for closing off chamber 97 from the brake cylinder device 6 and thereby terminating the so-called continued quick service reduction in brake pipe pressure. And also, with the reduction insuring valve 90 in its cut-off position, the valve cavity 100 disconnects the passage 102 from vent port 101 and connects said passage to the ports 93, 94, with the result that fluid under pressure from the brake cylinder device 6 will be supplied via passage 25 and said ports to the chamber 103 of loading device 14. Brake cylinder pressure thus supplied to chamber 103 will cause the diaphragm 104 to deflect against resistance of spring 105 and, through the medium of follower 108 and stem 107, exert an additional bias force on the reduction insuring valve 90 to hold same in its cut-off position until a certain phase during a brake releasing operation, as will hereinafter be described. It will be noted that the check valve 109 prevents supply of fluid from the brake cylinder to the chamber 103 in by-pass of the reduction insuring valve 90 for assuring that said valve will not be shifted to its cut-off position before the illustrative 6 p. s. i. reduction in brake pipe pressure has been effected.

The service valve 28 will remain in its previously defined brake application position, for supplying fluid under pressure from the auxiliary reservoir 5 to the brake cylinder device 6, until brake cylinder pressure in chamber 24 has increased to a value corresponding to the degree of reduction in brake pipe pressure; whereupon the service stack will be shifted against opposition of control reservoir pressure in chamber 17 by the combined effect of increasing brake cylinder pressure in chamber 24, reduced brake pipe pressure in chamber 19, and pressure of springs 33, 42, for thereby carrying the service valve to a lap position. In this position, the check valve 39 is seated by spring 42 and the projecting end of the service valve 28 sealingly engages said check valve for thereby sealing off the brake cylinder device from both the auxiliary reservoir passage 41 and the release passage 37, so as to bottle up fluid in the brake cylinder device at the desired pressure for maintaining brakes applied to the desired degree.

It will thus be seen that, according to a feature of the invention, the charging valve 59 is operated to its cut-off position, for closing the auxiliary reservoir slow charge communication and additionally closing the already closed control reservoir slow charge communication, by brake cylinder pressure supplied via the reduction insuring valve 90 in normal position to charging valve chamber 56; and that when said valve 90 moves to its cut-off position, auxiliary reservoir pressure will be admitted to chamber 56 for holding the charging valve 59 in its cut-off position.

*Effecting a release of brakes*

To initiate a release of brakes throughout the train, the operator causes fluid under pressure to be supplied to the brake pipe 3 at the locomotive in the manner already described in connection with initial charging. The consequent increase in brake pipe pressure in chamber 19 of the service valve device 8 on a particular car will cause the corresponding service stack to shift downwardly and thereby carry the service valve 28 to its brake release position for releasing fluid under pressure from the brake cylinder device 6 and chamber 24 to atmosphere via passage 25, chamber 30, exhaust opening 31, passage 37, and release choke 38.

To effect a partial or graduated release of brakes, brake pipe pressure is increased a degree corresponding to the degree of brake release desired; and when brake cylinder pressure in chamber 24 has thus reduced a degree corresponding to the selected increase in brake pipe pressure, the service valve 28 will be returned to its lap position. If, however, brake pipe pressure is permitted to increase continuously to its normal full charge value, the service valve 28 will remain in brake release position for completely venting brake cylinder pressure via the communication just described.

Meanwhile, as brake pipe pressure increases, the auxiliary reservoir 5 and hence chamber 44 of the quick service valve device 9 will be recharged from, and at substantially the same rate as, the passage 20 via the previously defined auxiliary reservoir fast charge communication, including the check valve 112; however, auxiliary reservoir pressure will be less than the pressure in passage 20 by the illustrative 1.7 p. s. i., due to the bias of spring 113.

When brake pipe pressure in chamber 46 of the quick service valve device 9, as assisted by pressure of spring 45, overcomes the opposing effect on movable abutment 43 of auxiliary reservoir pressure in chamber 44, the quick service valve 47 will be returned to its normal position for cutting off the brake pipe passage 36 from the quick service volume 51 and also opening the passage 52 to the passage 50, although the control reservoir slow charge communication will nevertheless be maintained closed by the charging valve 59 (which is still in cut-off position) for thereby preventing backflow through said communication from the control reservoir 4 to the brake pipe at a time when brake pipe pressure may be considerably below its normal full charge value.

When brake pipe pressure has been restored to a value about 3 p. s. i. below control reservoir pressure, brake cylinder pressure in chamber 103 of the loading device 14 (as noted via cavity 100 of reduction insuring valve 90 in cut-off position and ports 93, 94) will have been reduced sufficiently to permit the reduction insuring valve diaphragm 86 to be deflected by the combined effect of brake pipe pressure in chamber 89, pressure in chamber 97 and pressure of spring 92 against combined resistance of control reservoir pressure in chamber 88 and brake cylinder pressure in chamber 103 of the loading device 14 (as imposed via the stem 107 on said valve 90) for shifting the reduction insuring valve 90 from its cut-off position to an intermediate position, between its cut-off and normal positions.

According to a feature of the invention, with the reduction insuring valve 90 in intermediate position, pressure of fluid in the chamber 97 is immediately dissipated into the substantially vented brake cylinder device 6 by flow without restriction via opening 96 and cavity 95 of said valve 90, and through port 94 to passage 25, and thence past the previously unseated inshot valve 81 to brake cylinder passage 27, for thereby causing said reduction insuring valve to positively pause in this position due to the loss of the bias effect theretofore exerted by fluid pressure in chamber 97; and it will be noted that pressure in the quick service volume 51 will blow down via passage 50 and at the rate controlled by the continued quick service reduction choke 111 into the substantially vented chamber 97, from which it will be immediately dissipated, as just described. Also, with the reduction insuring valve 90 in intermediate position, valve cavity 99 maintains auxiliary reservoir passage 41 connected to passage 98 for maintaining charging valve chamber 56 charged with fluid at auxiliary reservoir pressure so as to maintain the charging valve 59 in its cutoff position; and cavity 100 connects passage 102 to port 93 for maintaining chamber 103 open to the brake cylinder device 6 so that brake cylinder pressure, though then at a low value, will still exert a bias on the reduction insuring valve 90 through the medium of the stem 107.

Hence, as more fully explained in the copending application of Glenn T. McClure, U. S. Serial No. 486,771, filed February 8, 1955, and assigned to the assignee of the present invention, because of the bias exerted by brake cylinder pressure on the loading diaphragm 104, brake pipe pressure may be increased to and varied within a range between 6 p. s. i. and about 3¼ p. s. i. below its normal full charge value without causing the reduction insuring valve 90 to move from cut-off position and hence without venting the quick service volume 51; and this permits brakes to be released and reapplied to a degree less than that corresponding to the preselected minimum degree of brake application corresponding to the illustrative 6 p. s. i. reduction effected by previously described continued quick service activity. If brake pipe pressure is increased to about 3 p. s. i. below its normal charge value and then lapped, the valve 90 will operate to vent the quick service volume 51, but maintain charging valve chamber 56 charged. Hence, so long as brake pipe pressure is not increased to within about 2.1 p. s. i. of its normal full charge value, the charging valve 59 will be maintained indefinitely in its cut-off position but if brake pipe pressure is subsequently reduced a slight degree after having been lapped, at a value between about 3 p. s. i. and 2.1 p. s. i. below normal charge value, the quick service valve 47 will operate to vent brake pipe pressure into the then vented quick service volume for causing a quick service reduction in brake pipe pressure.

If and when brake pipe pressure is increased to within about 2.1 p. s. i. of its normal full charge value, the service valve 28 in brake release position will have operated to completely vent the brake cylinder device 6 and hence the chamber 103 of device 14; whereupon the reduction insuring valve 90 will move to its previously defined normal position, in which it is shown, unopposed by the loading device 14. With valve 90 in this position, the chamber 103 is disconnected from the brake cylinder device and opened directly to atmosphere via the vent port 101; and fluid under pressure is vented from charging valve chamber 56 into the vented brake cylinder device 6 via communication including chamber 97, opening 96, cavity 95, and the ports 93, 94, thereby causing the charging valve 59 to be shifted to its charging position, for opening the previously defined control reservoir slow charge communication (including passage 20, choke 54, passages 53, 52, cavity 60 and passage 18) and the auxiliary reservoir slow charge communication (which includes passage 20, choke 63, passage 62, cavity 61, and passage 41). Backflow from the control reservoir into the brake pipe via the control reservoir slow charge communication will thus be negligible due to the restricted flow capacity of choke 54 and the very slight and continually reducing pressure differential across said choke.

Thus, according to the invention, the charging valve 59 will be maintained in its cut-off position until the brake cylinder device 6 has been completely vented for minimizing back-flow from the control reservoir to the brake pipe. Also the reduction insuring valve 90 will more positively pause in its intermediate position because pressure of fluid in chamber 97 will be immediately dissipated into the then substantially vented brake cylinder device.

*Description and operation—Fig. 2*

The apparatus shown in Fig. 2 differs from that shown in Fig. 1, in that the check valve 109 and its bias spring 110, as shown in Fig. 1, are eliminated and the chamber 103 is open to the brake cylinder device 6 via a branch of passage 25; and a plug 114 is inserted in a main casing portion 115 so as to seal off that part of the passage 102 leading to the valve bore 91 of the reduction insuring valve device 13. In all other respects the modified apparatus shown in Fig. 2 is identical with that shown in Fig. 1, and the same reference numerals have been used in both figures to designate identical parts.

Referring to both figures of the drawing, with the modified apparatus, as soon the service valve 28 moves to brake application to supply fluid under pressure from the auxiliary reservoir 5 to the brake cylinder device 6, in the manner already described, fluid will be supplied to the chamber 103 of loading device 14 via passage 25 and impose a downward force on the reduction insuring valve 90 through the stem 107, thereby causing the latter valve to move to its cut-off position when a reduction in brake pipe pressure of about 3 to 3½ p. s. i. has been effected, instead of the illustrative 6 p. s. i. reduction assured by continued quick service activity, as heretofore described in connection with the basic apparatus shown in Fig. 1; and it is for this reason that the basic apparatus is preferred. However, the modified apparatus is desirable in certain countries, such as France, where high braking ratios are used and where such continued quick service activity is therefore not desired because it would cause brake to be applied to an excessive degree whenever an initial reduction in brake pipe pressure of the illustrative .7 p. s. i. below its normal full charge value causes operation of the quick service valve 47 to its quick service position.

During a release of brakes, however, the modified apparatus will operate in the same manner as described in connection with Fig. 1, because in both arrangements brake cylinder pressure in chamber 103 of the loading device 14 will have an identical effect on operation of the reduction insuring valve 90; it being noted that in the basic apparatus the chamber 103 is open to the passage 25 via the reduction insuring valve 90 in its cut-off and intermediate positions, whereas in the modified apparatus the chamber 103 is open directly to the passage 25.

Since for purposes of standardization the reduction insuring valve device 13 is identical in both arrangements, the plug 114 is provided to prevent leakage of brake cylinder pressure from passage 25 via the cavity 100 in the reduction insuring valve 90 to passage 102 and hence to atmosphere between sections of the casing when said valve is in its previously defined cut-off and intermediate positions, in which brake cylinder pressure is admitted via said cavity to the passage 102.

*Summary*

It will now be seen that in both embodiments of the improved brake apparatus, the quick service valve 47 operates in response to an initial slight reduction in brake pipe pressure, illustratively assumed as .7 p. s. i., below its normal full charge value to close the control reservoir slow charge communication (which includes the passage 20, choke 54, passages 53, 52, charging valve cavity 60 and control reservoir passage 18) by disconnecting the passages 53, 52; that the service valve 28 thereafter operates to supply fluid under pressure to the brake cylinder device 6; and that according to the invention, charging valve 59 thereafter operates in response to brake cylinder pressure admitted under control of the reduction insuring valve 90 to additionally close said communication and also close an auxiliary reservoir slow charge communication (which includes passage 20, choke 63, passage 62, charging valve cavity 61, and auxiliary reservoir passage 41). In the basic apparatus (Fig. 1), the reduction insuring valve 90 thereafter operates to insure that the quick service reduction in brake pipe pressure will continue until brake pipe pressure is reduced a preselected degree, such as 6 p. s. i., whereupon said valve 90 moves to its cut-off position for terminating continued quick service activity and supplying auxiliary reservoir pressure to the charging valve device 10 for maintaining the charging valve 59 in its cut-off position. In the modified apparatus, brake cylinder pressure admitted to chamber 103 of the loading device 14 via passage 25 during a brake application exerts a force on the reduction insuring valve 90, causing the latter to move to its cut-off position when brake pipe pressure is reduced about 3 to 3½ p. s. i. below its normal value.

With both arrangements, during a release of brakes, brake cylinder pressure in chamber 103 of device 14 will impose a force on the reduction insuring valve 90 such that it will move to a defined intermediate position, when brake pipe pressure is restored to about 3 p. s. i. below normal full charge value, for venting the quick service volume 51 and maintaining auxiliary reservoir pressure supply to the charging valve device 10; and according to the invention, said valve 90 will positively pause in said position due to the immediate unrestricted release of fluid pressure from chamber 97 to the brake cylinder device 6 which had hitherto exerted a force tending to move said valve 90 toward its normal position. This pause is obtained by placing the continued quick service reduction choke 111 between the quick service volume 51 and chamber 97, instead of between the latter and the brake cylinder device as in arrangements heretofore proposed.

Having now described the invention, what I claim as new and desire to secure by Letters Patent, is:

1. In a fluid pressure brake apparatus, the combination of a normally charged brake pipe, a normally charged auxiliary reservoir, a normally charged control reservoir, a normally open charging communication connecting said control reservoir with said brake pipe, a brake cylinder, charging valve means having a normally vented chamber and responsive to pressure of fluid supplied to said chamber to move to a cut-off position for closing said charging communication, service valve means responsive to a chosen reduction in brake pipe pressure below control reservoir pressure to supply fluid under pressure from said auxiliary reservoir to said brake cylinder, and quick service reduction insuring valve means normally establishing a substantially unrestricted flow connection between the chamber and said brake cylinder for causing said charging valve means to be operated by brake cylinder pressure to its cut-off position, said reduction insuring valve means being responsive to a preselected reduction in brake pipe pressure, greater than said chosen reduction, to close off the chamber of said charging valve means from said brake cylinder and open said chamber to said auxiliary reservoir for maintaining said charging valve means in its cut-off position.

2. In a fluid pressure brake apparatus, in combination, a normally charged brake pipe, a normally charged auxiliary reservoir, a normally charged control reservoir, a normally open charging communication connecting the control reservoir with the brake pipe, a brake cylinder, a quick service volume independent of said brake cylinder, a normally open restricted quick service communication connecting said quick service volume with said brake cylinder, quick service valve means responsive to an initial slight reduction in brake pipe pressure below its normal full charge value to successively close said charging communication and then open said brake pipe to said quick service volume and quick service communication for effecting a local quick service reduction in brake pipe pressure, service valve means normally connecting the brake cylinder to the atmosphere and responsive to a chosen reduction in brake pipe pressure, greater than said slight reduction, to supply fluid under pressure from said auxiliary reservoir to said brake cylinder, charging valve means having a control chamber normally in substantially unrestricted fluid pressure communication with said brake cylinder and operable by brake cylinder pressure supplied to the control chamber to a cut-off position for additionally closing said charging communication, and reduction insuring valve means responsive to a reduction in brake pipe pressure greater than said chosen reduction to close said quick service communication and cut off said brake cylinder from the control chamber and open the latter to the auxiliary reservoir for maintaining said charging valve means in its cut-off position.

3. In a fluid pressure brake apparatus, the combination of a normally charged brake pipe, a normally charged auxiliary reservoir, a normally charged control reservoir, a normally open restricted charging communication connecting said control reservoir with said brake pipe, a brake cylinder, a quick service volume other than said brake cylinder, quick service valve means subject opposingly to brake pipe pressure and auxiliary reservoir pressure and responsive to a slight reduction in brake pipe pressure relative to auxiliary reservoir pressure to close said charging communication and connect said brake pipe to said volume for effecting a quick service reduction in brake pipe pressure, and responsive to subsequent substantial equalization of brake pipe pressure and auxiliary reservoir pressure to disconnect said brake pipe from said quick service volume and no longer close said charging communication, charging valve means having a control chamber and responsive to pressurization of said control chamber to additionally close said charging communication, continued quick service reduction choke means interposed between said quick service volume and another chamber, reduction insuring valve means subject to control reservoir pressure in opposition to a spring bias and pressures of fluid in the brake pipe and said other chamber and normally biased by the spring bias to a normal position for establishing respective substantially unrestricted flow connections between said control chamber and brake cylinder and between said other chamber and brake cylinder, said reduction insuring valve means being responsive to a chosen reduction in brake pipe pressure, greater than said slight reduction, to assume a cut-off position for closing the respective flow connections and connecting said auxiliary reservoir to said control chamber, said reduction insuring valve means being responsive during a brake release to a subsequent increase in brake pipe pressure to a certain value, greater than that corresponding to said chosen reduction and less than its normal full charge value, to assume an intermediate position for immediately venting pressure from said other chamber into said brake cylinder via one of the respective unrestricted flow connections while maintaining the control chamber of said charging valve means connected to the auxiliary reservoir, said reduction insuring valve means thereupon losing assist from the pressure of fluid thus released from said other chamber into said brake cylinder and in consequence thereof pausing in said intermediate position, said reduction insuring valve means being thereafter responsive to a greater increase in brake pipe pressure to return to its said normal position, and service valve means responsive to a preselected reduction in brake pipe pressure, greater than said slight reduction and less than said chosen reduction, to effect supply of fluid under pressure from said auxiliary reservoir to said brake cylinder and responsive to a subsequent increase in brake pipe pressure to a value, greater than said certain value and less than its normal full charge value, to effect equalization of brake cylinder pressure with the atmosphere.

4. The combination according to claim 3, further characterized by the provision of loading means having a certain chamber constantly open to said brake cylinder and operative to impose a variable bias on said reduction insuring valve means resisting operation of the latter from its cut-off position toward its normal position, such bias varying according to the value of brake cylinder pressure in said certain chamber.

5. The combination according to claim 3, further characterized by the provision of fluid pressure operable loading means having a certain chamber and operative to exert a variable bias on said reduction insuring valve means resisting operation of the latter from its cut-off position to its normal position according to the value of pressure in said certain chamber, said reduction insuring valve means being operative in its normal position to connect said certain chamber to the atmosphere and operative in its cut-off and intermediate positions to open said certain chamber to said brake cylinder.

6. The combination according to claim 5, including a certain communication connecting said certain chamber and brake cylinder in bypass of said reduction insuring valve means, and means interposed in said certain communication for preventing flow through said certain communication from said brake cylinder to said certain chamber while permitting flow therethrough in the reverse direction.

References Cited in the file of this patent

UNITED STATES PATENTS

| | | |
|---|---|---|
| 2,661,248 | Keller | Dec. 1, 1953 |
| 2,714,534 | Keller | Aug. 2, 1955 |

FOREIGN PATENTS

| | | |
|---|---|---|
| 712,596 | Great Britain | July 28, 1954 |